F. F. BEAUCHAMP.
VAPOR CONVERTER.
APPLICATION FILED DEC. 1, 1916.
1,284,216.
Patented Nov. 12, 1918.
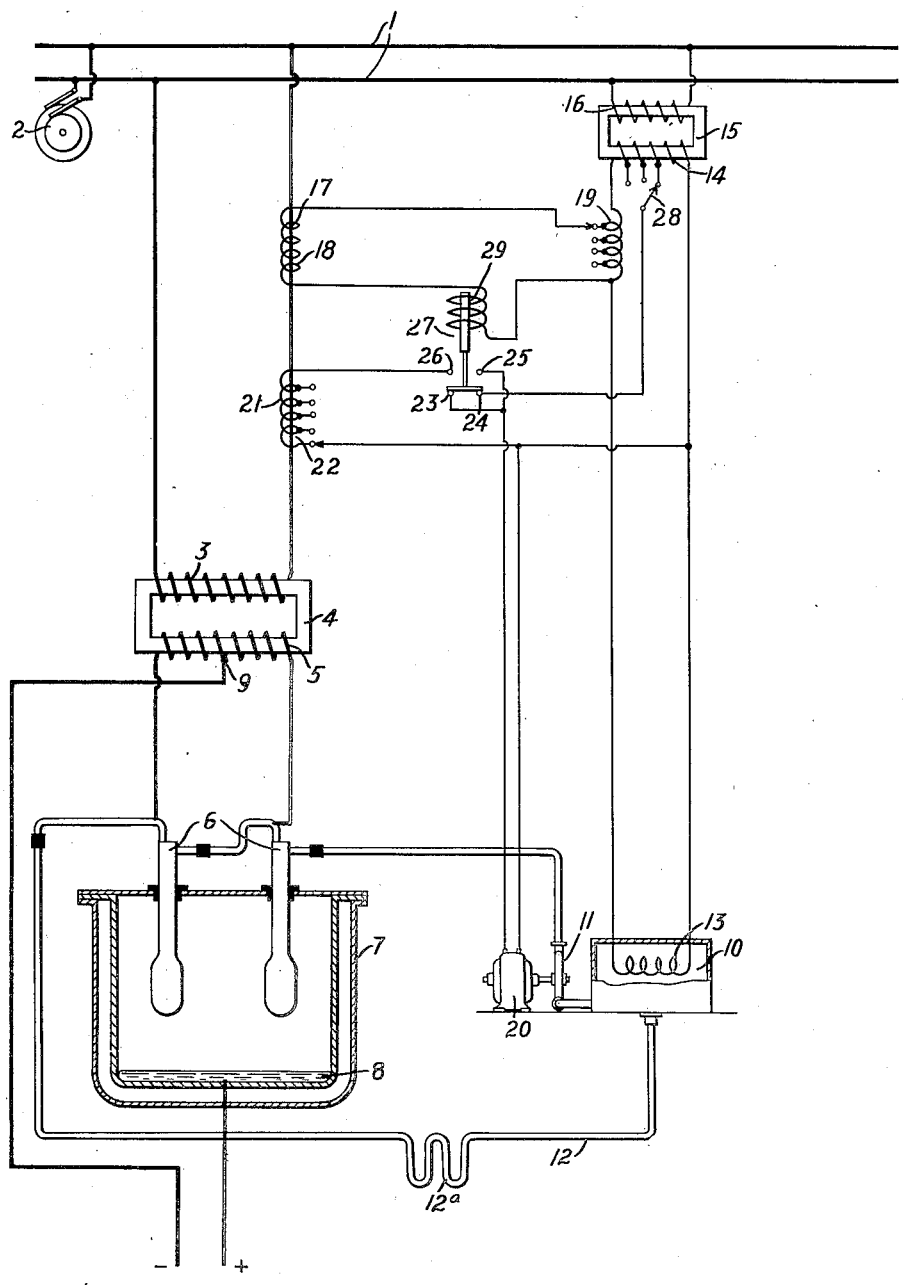
WITNESSES:
Fred. A. Lind
O. U. Kennedy
INVENTOR
Fannon F. Beauchamp
BY
Wesley G. Carr
ATTORNEY

UNITED STATES PATENT OFFICE.

FANNON F. BEAUCHAMP, OF KANSAS CITY, KANSAS, ASSIGNOR TO WESTINGHOUSE ELECTRIC & MANUFACTURING COMPANY, A CORPORATION OF PENNSYLVANIA.

VAPOR-CONVERTER.

1,284,216.     Specification of Letters Patent.     Patented Nov. 12, 1918.

Application filed December 1, 1916. Serial No. 134,305.

*To all whom it may concern:*

Be it known that I, FANNON F. BEAUCHAMP, a citizen of the United States, and a resident of Kansas City, in the county of Wyandotte and State of Kansas, have invented a new and useful Improvement in Vapor-Converters, of which the following is a specification.

My invention relates to vapor converters and particularly to means for automatically controlling the temperature and rate of flow of the circulating medium in the anode-cooling system of a vapor converter.

In a copending patent application, Serial No. 119,286, filed Sept. 9, 1916, by Edward P. Dillon, and assigned to the Westinghouse Electric & Manufacturing Company, is shown and described, in connection with an automatically controlled vapor-converter substation, an arrangement for automatically regulating the temperature in the anode-cooling system of a vapor converter which comprises a thermostatic device that is adapted to energize a heating coil located in the cooling system or to admit a cooling medium in order to lower the temperature in the system. In the above-described arrangement, the rate at which heat is generated by the heating coil is substantially constant and, as the coil is intermittently energized and deënergized in accordance with the operation of the thermostatic device, it is not possible to maintain a constant temperature throughout the whole system on account of a certain time lag that must occur in the operation of the device. Furthermore, as the rate of flow of the cooling medium is always the same, an appreciable amount of heat energy is lost while the converter is operating under light loads because the rate of flow must always be great enough to dissipate the heat generated in the anodes, when operating under heavy loads.

According to my invention, I provide an arrangement in which the rate at which heat is generated by the heating coil is automatically varied in accordance with the load on the converter so that, while the heating coil operates continuously, it generates only sufficient heat to maintain the temperature in the cooling system substantially constant at all loads. Furthermore, the rate of flow of the cooling medium is also varied in accordance with the load on the converter so that the rate of flow shall be a maximum at heavy loads and a minimum at light loads. In addition, provision is made for maintaining the anodes at their proper operating temperature even when the converter is not under load, so that no time will be lost in warming up the anodes when it is desired to suddenly put the converter in operation after it has been standing idle for an appreciable length of time.

The single figure of the accompanying drawing is a diagrammatic view of a vapor converter and its auxiliary apparatus and circuit connections arranged in accordance with my invention.

Mains 1 are connected to a suitable alternating-current source, such, as a single-phase alternator 2, and the primary winding 3 of a main transformer 4 is connected thereto. The terminals of the secondary winding 5 of the transformer 4 are respectively connected to the anodes 6 of a vapor converter 7. The mercury cathode 8 of the converter 7 and the mid-point 9 of the secondary winding 5 are connected to a direct-current receiving circuit, in accordance with the usual practice.

The anodes 6 are located in a cooling system which comprises a reservoir 10 and a circulating pump 11, the anodes being connected to the reservoir and the pump by means of piping 12 which may also include radiating coils 12ª. A heating coil 13 is located in the reservoir 10 and the terminals thereof are connected across the secondary winding 14 of an auxiliary transformer 15. The primary winding 16 of the transformer 15 is connected to the mains 1. A series transformer 17 is located in one supply lead of the converter 7, the secondary winding 18 of which is connected in series-circuit relation with the winding 19 of an auto-transformer that is connected in one lead of the heating coil 13. The secondary winding 18 and the auto-transformer winding 19 are so arranged that the current induced in the secondary winding 18 opposes the flow of current in the winding 19.

The pump 11 is adapted to be driven by an electric motor 20 which is preferably of the single-phase, series-wound type. One terminal of the motor 20 is connected in common to one terminal of the secondary winding 14 of the auxiliary transformer 15 and to one terminal of the secondary winding 21 of a series transformer 22 that is located in one supply lead of the converter 7. The other terminal of the motor 20 is connected to one lower stationary contact member 23 and to one upper stationary contact member 25 of a relay device 27. The other lower contact member 24 is adapted to be connected to taps of the secondary winding 14 through a pivoted contact member 28, and the other upper contact member 26 is connected to the upper terminal of the secondary winding 21 of the series transformer 22. An operating solenoid 29 of the relay 27 is connected in series-circuit relation with the secondary winding 18 and the auto-transformer winding 19.

Having fully described the various parts entering into my invention, the operation is as follows. During periods of no load on the converter 7, the heating coil 13 is continuously energized from the auxiliary transformer 15 so that the anodes are maintained at their proper operating temperature. As there is no current then flowing in the main leads of the converter, the solenoid 29 is deenergized and the terminals of the motor 20 are connected across a portion of the secondary winding 14 of the auxiliary transformer 15 through the lower contact members 23 and 24. The voltage impressed upon the motor may be varied by means of the taps provided on the secondary winding 14 so that the speed of the pump 11 may be properly adjusted for the capacity of the cooling system. While there is no load on the converter, however, the pump 11 operates at substantially constant speed for any predetermined setting of the switch arm 28, this speed being only a fraction of the normal speed of the motor.

As the load comes on the converter, the current induced in the secondary winding 18 of the series transformer 17 opposes the flow of current in the auto-transformer winding 19, thereby reducing the voltage impressed upon the heating coil 13. It is apparent then that the amount of heat generated by the heating coil 13 will decrease at substantially the same rate that the amount of heat generated in the anode 6 increases, by reason of the differential action between the windings 18 and 19. The solenoid 29 of the relay device 27 is so designed that, while the current in the secondary winding 18 remains below a predetermined value, the lower contact members 23 and 24 will remain closed and the motor 20 will operate as previously described. When, however, the load on the converter increases to such an amount that the current in the secondary winding exceeds the predetermined value, the upper contact members 25 and 26 will be closed, thereby connecting the terminals of the motor across the secondary winding 22 of the series transformer 21. The voltage applied to the motor will then vary in accordance with the load on the converter so that the rate of flow of the cooling medium will be a maximum when the converter is operating at full load. A decrease in the load on the converter will cause a corresponding decrease in the speed of the motor and, if the load approaches a zero value, the relay device 27 will automatically connect the motor across a portion of the secondary winding 14 before the voltage across the secondary winding 22 decreases to such a value that the motor ceases to operate.

From the foregoing, it is apparent that the cooling medium will be maintained at a substantially constant temperature and that a minimum amount of energy will be consumed by the heating coil. Furthermore, the amount of heat dissipated by the cooling system will be reduced to a minimum owing to the fact that the rate of flow of the cooling medium is very small when it is necessary to supply heat to the system in order to maintain the proper operating temperature and that the rate of flow is correspondingly great when it is necessary to dissipate heat from the system in order to prevent the anodes from exceeding their proper operating temperature. Consequently the converter is always operated under the most favorable conditions, with a minimum expenditure of energy in the auxiliary apparatus.

While I have shown my invention in its preferred form and as applied to a single-phase system, it is not so limited but may be as readily applied to a polyphase system and is capable of various minor changes and modifications within the scope of the appended claims.

I claim as my invention:

1. The combination with a vapor converter provided with a cooling system and an external source of heat located in said system, of means for automatically varying the rate at which heat is generated by said source in accordance with the load on said converter.

2. The combination with a vapor converter provided with a cooling system, and a source of heat located in said system external to said converter, of means for automatically varyng the rate at which heat is generated by said external source in accordance with the rate at which heat is generated within said converter.

3. The combination with a vapor converter provided with a cooling system, of a source of heat located in said system external to said converter and so connected thereto that the amount of heat generated by said source automatically decreases as the amount of heat generated within said converter increases.

4. The combination with an alternating-current source, and a vapor converter connected thereto and provided with a cooling system, of means for automatically regulating the temperature in said system in accordance with the current supplied to said converter.

5. The combination with an alternating-current source, a vapor converter connected thereto and provided with a cooling system, and a heating coil located in said system and connected to said source, of means for automatically varying the rate at which heat is generated by said coil in accordance with the current supplied to said converter.

6. The combination with an alternating-current source, and a vapor converter connected thereto and provided with a cooling system, of a heating coil located in said system and so connected to said source that the rate at which heat is generated thereby automatically varies in accordance with the current supplied to said converter.

7. The combination with an alternating-current source and a vapor converter connected thereto and provided with a cooling system, of a heating coil located in said system and so connected to said source that the amount of heat generated thereby automatically decreases as the current supplied to said converter increases.

8. The combination with an alternating-current source and a vapor converter connected thereto and provided with a cooling system, a heating coil located in said system and connected to said source, and an inductive winding in series-circuit relation with said coil, of means for opposing the flow of current in said winding in accordance with the current supplied to said converter.

9. The combination with an alternating-current source and a vapor converter connected thereto and provided with a cooling system, a heating coil located in said system and connected to said source, and an inductive winding in series-circuit relation with said coil, of a series transformer connected between said converter and said source, the secondary winding of which opposes the flow of current in said inductive winding.

10. The combination with a vapor converter provided with a cooling system, of means for automatically varying the rate of flow of the cooling medium in said system in accordance with the load on said converter.

11. The combination with a vapor converter provided with a cooling system and a pump for causing the circulation of a cooling medium, of means for automatically varying the operation of said pump in accordance with the load on said converter.

12. The combination with a vapor converter provided with a cooling system and a pump driven by a motor for causing the circulation of a cooling medium, of means for automatically varying the speed of said motor in accordance with the load on said converter.

13. The combination with a vapor converter provided with a cooling system and a pump driven by a motor for causing the circulation of a cooling medium, of means for automatically increasing the speed of said motor as the load on said converter increases.

14. The combination with a vapor converter provided with a cooling system, of means for causing the circulation of a cooling medium therein at a predetermined rate during the operation of said converter at light load, and further means for automatically varying the rate of flow of said medium in accordance with the load on said converter after the said load has exceeded a predetermined value.

15. The combination with a vapor converter provided with a cooling system, of means for causing the circulation of a cooling medium therein at a predetermined rate while the converter is not operating, and further means for automatically varying the rate of flow of said medium in accordance with the load on said converter after the load has exceeded a predetermined value.

16. The combination with a vapor converter provided with a cooling system, of means for causing the circulation of a cooling medium therein at a predetermined rate while the load on said converter is below a predetermined value, and further means for automatically varying the rate of flow of said medium in accordance with the load on said converter after the load has exceeded a predetermined value.

17. The combination with an alternating-current source and a vapor converter connected thereto and provided with a cooling system, of means for automatically varying the rate of flow of a cooling medium in said system in accordance with the current supplied to said converter.

18. The combination with an alternating-current source and a vapor converter connected thereto and provided with a cooling system and a pump driven by an electric motor for causing the circulation of a cooling medium, of means for automatically varying the speed of said motor in accordance with the current supplied to said converter.

19. The combination with an alternating-current source and a vapor converter connected thereto and provided with a cooling system and a pump driven by an electric motor for causing the circulation of a cooling medium, of means for automatically varying the voltage impressed on said motor in accordance with the current supplied to said converter.

20. The combination with an alternating-current source, a vapor converter connected thereto and provided with a cooling system, and a pump driven by an electric motor for causing the circulation of a cooling medium, of means for automatically connecting said motor to said source when the current supplied to said converter falls below a predetermined value.

21. The combination with an alternating-current source, a vapor converter connected thereto and provided with a cooling system, and a pump driven by an electric motor for causing the circulation of a cooling medium, of means for automatically connecting said motor to said source when the current supplied to said converter falls below a predetermined value and for disconnecting said motor from said source when the current supplied to said converter exceeds a predetermined value.

22. The combination with an alternating-current source, a vapor converter connected thereto and provided with a cooling system, and a pump driven by an electric motor for causing the circulation of a cooling medium, of means for automatically connecting said motor to said source when the current supplied to said converter falls below a predetermined value and for varying the voltage impressed on said motor when the current supplied to said converter exceeds a predetermined value.

23. The combination with an alternating-current source, a vapor converter connected thereto and provided with a cooling system, and a pump driven by an electric motor for causing the circulation of a cooling medium, of a relay device controlled by the current supplied to said converter for automatically connecting said motor to said source when the current supplied to said converter falls below a predetermined value and for disconnecting said motor from said source when the current supplied to said converter exceeds a predetermined value.

24. The combination with an alternating-current source, a vapor converter connected thereto and provided with a cooling system, and a pump driven by an electric motor for causing the circulation of a cooling medium, of a series transformer connected in one supply lead of said converter, the secondary winding of which is adapted to energize said motor.

25. The combination with an alternating-current source, a vapor converter connected thereto and provided with a cooling system, and a pump driven by an electric motor for causing the circulation of a cooling medium, of a series transformer connected in one supply lead of said converter, the secondary winding of which is adapted to energize said motor while the current supplied to said converter exceeds a predetermined value.

26. The combination with an alternating-current source, a vapor converter connected thereto and provided with a cooling system, and a pump driven by an electric motor for causing the circulation of a cooling medium, of a series transformer connected in one supply lead of said converter, a relay device for connecting said motor to said source and to the secondary winding of said transformer, and a second series transformer connected in one supply lead of said converter, the secondary winding of which is adapted to operate said relay device.

27. The combination with a vapor converter provided with a cooling system, of means for automatically varying the temperature and the rate of flow of the cooling medium therein, in accordance with the load on said converter.

28. The combination with a vapor converter provided with a cooling system, a heating coil located therein and a pump for causing the circulation of a cooling medium, of means for varying the energization of said coil and the operation of said pump in accordance with the load on said converter.

29. The combination with a vapor converter provided with a cooling system, of means for automatically decreasing the temperature and for increasing the rate of flow of the cooling medium in said system when the load on said converter increases.

In testimony whereof, I have hereunto subscribed my name this 18th day of Nov., 1916.

FANNON F. BEAUCHAMP.